May 12, 1959   R. W. TUTHILL ET AL   2,886,696
ELECTRIC ARC WELDING
Filed April 2, 1958

*INVENTORS*
Roger W. Tuthill
Alanson U. Welch
BY  H. Hume Mathews
    Edmund W Bopp
ATTORNEY & AGENT United States Patent Office 2,886,696
Patented May 12, 1959

2,886,696

ELECTRIC ARC WELDING

Roger W. Tuthill, Elizabeth, N.J., and Alanson U. Welch, York, Pa., assignors, by mesne assignments, to Air Reduction Company, Incorporated, New York, N.Y., a corporation of New York Application April 2, 1958, Serial No. 725,887

9 Claims. (Cl. 219—137)

This invention relates to consumable electrode electric arc welding and more particularly to automatic and semi-automatic gas shielded electric arc welding of the type in which a consumable wire electrode of indefinite length is mechanically fed to a welding arc formed between the electrode and the work. A welding process of this type which is now well-known is the inert gas shielded metal arc welding process disclosed and claimed in Muller et al. Patent No. 2,504,868. The process of that patent is characterized by the projection of small discrete metal droplets axially from the end of the electrode wire with sufficient force and velocity to overcome the force of gravity. Reference should be made to the Muller et al. patent for a more complete disclosure of this type of metal transfer. It is believed to be sufficient to point out here that this type of transfer is completely free of short-circuiting of the arc by transferring electrode metal.

Following the Muller et al. development referred to above, repeated attempts have been made to produce alternative processes utilizing consuming wire electrodes within a gas shield that would result in some or all of the benefits of the Muller et al. process with the objective of providing a lower cost process or a process specifically designed to solve some particular problem encountered with the normal use of the said Muller et al. process. One such development is the process whose elements are analogous to those of Muller et al., with the exception that carbon dioxide is used as the shielding gas in place of the monatomic inert gas. Some success has been achieved utilizing a carbon dioxide shielding atmosphere, although the process is by no means the full equivalent of the inert gas shielded process. The principal advantage of the substitution of carbon dioxide for the inert gas is one of cost. At present market prices, carbon dioxide costs much less than inert monatomic gas. This saving is largely compensated for by the many disadvantages resulting from the substitution. For instance, it is impossible to get spray transfer in a carbon dioxide atmosphere using the same bare wire electrode as is used in inert gas. The carbon dioxide shielded process is not at all suitable for use with many metals because of its highly oxidizing nature. Its principal area of usefulness is in the welding of mild or low alloy steels. Even where it is most useful the process is accompanied by the generation of substantial amounts of weld spatter which wastes weld metal, spoils the appearance of the welded product and, most important, damages the welding equipment and results in a considerable loss of time due to the necessity of interrupting the welding process frequently to clean spatter from the apparatus. The accumulation of spatter in the apparatus obstructs the gas nozzle and interferes with proper gas shielding. Special operating techniques have been developed to minimize these problems, such as the careful control of arc length. Under these conditions the carbon dioxide shielded consuming electrode arc welding process has found rather widespread usefulness in spite of the several drawbacks inherent in the process.

A limitation of all of the present automatic and semi-automatic consuming electrode arc welding processes evolves from the inherent high heat input to the work. A continuous arcing from the electrode to the work at relatively high current levels produces super-heated weld metal, i.e., the metal transferring across the arc from the electrode to the work is at or near the boiling temperature. Under these conditions, the weld pool produced is relatively large and very fluid. This makes it difficult to hold in place and to otherwise control when welding in other than the downhand position. Because of the fluidity of the pool, gravity tends to cause the weld pool to sag or run out unless it is dammed up or otherwise controlled by manipulation. The high heat of the pool also has the effect of limiting the usefulness of the consuming electrode processes in thin section work, due to the tendency to melt through such thin sections.

It is an object of the present invention to provide a substantially spatter-free method of gas shielded automatic or semi-automatic welding with a continuously fed wire electrode in active gas atmospheres.

Another object is to provide a method of producing sound welds with a small pool of relatively low temperature weld metal in automatic or semi-automatic welding with a continuously fed wire electrode.

Another object is to provide a simple and reliable method of out of position welding.

These and other objects and advantages of the invention will be pointed out or will become apparent from the following description of the invention.

In accordance with the present invention the aforesaid objects can be realized by the utilization of a welding circuit, including a welding power supply having certain essential static and dynamic characteristics, coupled with a proper electrode wire feed rate under conditions that will produce repetitive, controlled current, short-circuiting of the wire and weld pool with transfer of weld metal from the electrode to the pool only during short-circuiting conditions. More particularly it has been found that these objects may be achieved by using a welding power supply with some particular low steady state output voltage that is insufficient in itself to sustain the arc in equilibrium under the particular welding conditions, and by having sufficient inductive reactance in the circuit to control the current build-up on short circuit in a manner to permit an arc to be formed while preventing excessive current, which, if uncontrolled would blast out metal from the electrode and weld pool disrupting the arc and causing excessive spatter. The inductive reactance must also satisfy the requirement of being capable of storing sufficient energy in its field during short circuit conditions to be able to super-impose a voltage on the steady state output voltage as the inductive field decays to sustain the arc for a limited time prior to recurrence of the short circuiting and reinitiation of the cycle. When the short circuit repetition rate is high enough and other conditions are proper no molten metal will transfer across the arc, i.e., the transfer of metal from the electrode to the work will occur only when the electrode end is in contact with the pool. Under these conditions spatter is virtually eliminated and the molten metal is not super-heated as in ordinary open arc welding.

For a complete understanding of the invention reference should be made to the following detailed description and the accompanying drawings in which.

Figure 1:
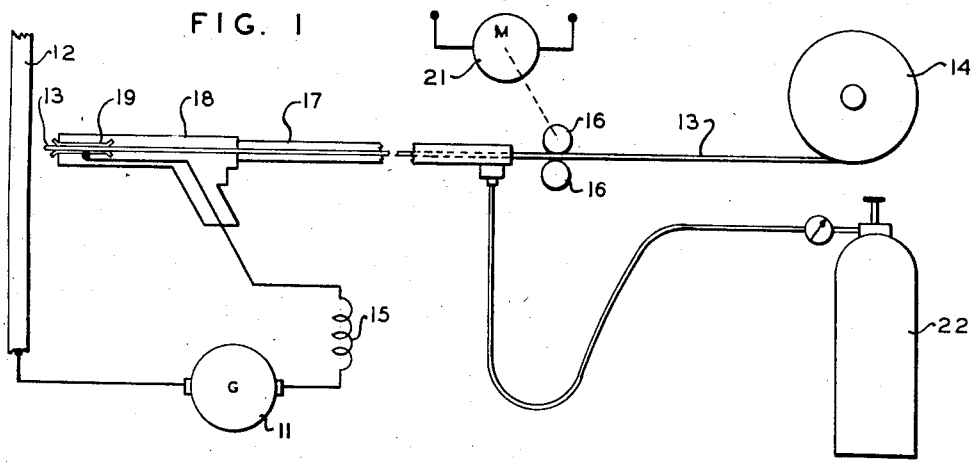
Fig. 1 represents, in simplified form, a complete welding system capable of operation in accordance with the present invention.

Fig. 1 represents schematically a complete welding system in which welding current is supplied from a welding power source 11 to a workpiece 12 and a wire electrode 13. The welding wire is drawn from a supply reel 14 by feed rolls 16 and pushed through a flexible casing 17 to a welding gun 18 within which the welding current is introduced into the wire by a contact element 19. The feed rolls 16 are driven by an electric motor 21 which is preferably capable of operation at an adjustable constant speed. Shielding gas is supplied to the welding gun 18 through the casing 17 from a suitable gas source such as compressed gas cylinder 22. The design of the welding gun 18 may be in accordance with the prior art such as disclosed in Turbett Patent No. 2,727,970 or Anderson Patent No. 2,659,796. The wire feed rolls 16, the wire feed roll drive motor 21 and the wire supply reel 14 may all be incorporated in a single unit wire feeder such as that disclosed in Anderson Patent No. 2,681,401. This type of wire feed unit is known as a "push" gun because the electrode wire is pushed through the casing to the gun. It is to be understood that any type of gas shielded arc welding equipment may be used in the practice of the present invention, including specifically welding guns of the "pull" type, i.e., welding guns in which the wire feed rolls are located at or near the gun to pull the wire to the gun. Such systems are well known and are particularly well suited for use with small diameter electrode wires.

The welding current power source 11 is preferably motor or engine driven rotating generator or a transformer-rectifier welder, although other current sources, such as batteries, may be used. The particular electrical characteristics of the power source are critical and essential to the present invention as will be pointed out in detail hereinafter. It should be pointed out here, however, that a certain amount of inductive reactance is required in the power supply and its associated circuit. Reactor 15 has been illustrated in the circuit in Fig. 1 to represent the inductance of the welding leads, etc. as well as any series inductance that may be added to the circuit. The power supply must have a relatively low open circuit voltage.

In accordance with the present invention, the apparatus above described is operated as follows:

Motor 21, preferably operated at constant speed, rotates feed rolls 16 which withdraw electrode wire 13 from the wire supply reel 14. As the wire leaves the feed rolls 16 it passes through the flexible casing 17 and the welding gun 18. Shielding gas from the supply cylinder 22 is fed at regulated pressure to the welding gun through the casing 17 where it discharges as an annular stream surrounding the end of the electrode 13 as the electrode emerges from the welding gun 18. The power supply provides an electrical potential between the end of the electrode 13 and the work 12 so that when the electrode 13 makes contact with the work 12 welding current flows in the circuit. This power supply is preferably connected at reverse polarity, i.e., electrode positive and work negative, although the invention is not limited to this polarity. The voltage requirements of the power supply depend on the shielding gas employed and the electrode and the work materials. To operate satisfactorily in accordance with the present invention, the static voltage impressed across the arc gap by the welding power supply must be less than the voltage necessary to sustain an equilibrium arc condition. An equilibrium arc condition may be defined as that condition under which an arc can be maintained for an indefinite length of time, i.e., the wire burn-off rate equals the rate at which the electrode and weld pool are approaching one another. For instance, when welding with a .035 inch diameter steel wire on a steel workpiece using a carbon dioxide shielding atmosphere and a wire feed rate of the order of 200 inches per minute, the minimum arc sustaining voltage is of the order of 27 volts. Therefore in order to carry out the present invention the static voltage provided between the electrode and work by the power supply must be in the range from 17 to 26 volts, 1 to 10 volts below the minimum arc sustaining voltage. In addition the welding circuit must include a certain amount of inductance which may exist as inherent inductance in the power supply in the form of distributed inductance in the windings, etc., and/or in the form of an added built-in reactor or as an external reactor added to the circuit in series with the power supply. The inherent inductance of the welding leads are considered herein as added external inductance. As previously explained when the constantly advancing electrode wire 13 touches the work 12, the resulting high current surge pushes the molten pool away from the electrode to form an arc which can be sustained for only a limited period of time, due to the low static voltage characteristic of the generator. When the electrode 13 again comes in contact with the work either as a result of the advancement of the electrode toward the pool, or as a result of the resurgence of the oscillating weld pool toward the electrode or both, short-circuit conditions are again created and the cycle repeats.

While it is difficult to state the exact mechanics of the metal transfer from the electrode to the workpiece, it has been possible, through the aid of ultra-slow motion pictures, to see quite clearly certain aspects of the operation. Figures 2 through 6 are drawings based on individual frames of the ultra-slow motion pictures showing the relationship of the electrode to the weld pool at different times throughout one complete cycle of the operation. The ultra-slow motion pictures on which these drawings are based were made at the rate of approximately 4000 frames per second for projection at the conventional speed of 16 frames per second and for examination and study of individual frames. From these figures it may be clearly seen that following the physical contact of the electrode and workpiece, which is referred to herein as short circuiting, the weld pool and the electrode separate and form an arc gap and an arc therebetween. The power supply is unable to sustain this arc in equilibrium because its static output voltage is less than that needed, and as a result the current decays at a rate which maintains it below the value necessary to melt the electrode off at the rate the electrode and pool approach one another. Consequently the arc shortens until the pool and electrode again unite and reinitiate the cycle. Such repetition is only possible if the current surge during the short circuit period is sufficient to produce the necessary electrical forces to push the molten metal of the pool away from the solid wire to separate the two and form an arc gap. Such an electrical force is well known and is the same force responsible for the formation of the depression directly under the arc which is clearly visible in the inert gas shielded arc welding method of the Muller et al. patent previously referred to. It is believed that this repetitive arcing and short circuiting cycle does not necessarily depend on the electrode advancing. It has been observed that the molten pool is depressed and pushed away from the electrode end by the short circuit current surge and that as the current decreases after the arc is formed this depression starts to fill in and oscillation occurs in the weld pool. As a result of this oscillation, the molten pool surges back after having been pushed away and reaches up and again touches the electrode to recreate short circuit conditions. During the arcing time between short circuits, the end of the electrode is being heated by the arc and a certain amount of molten metal is formed on the electrode end. If the short circuit repetition rate is high no visible accumulation of molten metal ever has a chance to occur. If the repetition rate is low (relatively), it is possible with the aid of the ultra-slow motion pictures to see the formation of a small quantity of molten metal on the electrode end. The motion of this molten metal on the electrode may also contribute to the shortening of the arc gap as the current decays. In either case, the molten metal present on the electrode is wiped off the electrode each time the pool and electrode make contact. The pool oscillates as a result of the intermittent application to it of a force resulting from the flow of current during both the short circuit and arcing periods. The volume of the depression formed by the forces associated with the flow of current is believed to be proportional to the square of the current. Stated in another way, the total force applied to the molten metal is proportional to the square of the instantaneous value of the current. Due to the inductance in the welding circuit, the force applied to the pool is greater during the time the molten metal is receding from the electrode than during the time the molten metal is rising toward the electrode. Thus, energy is supplied to the oscillation to maintain it in motion against damping forces.

While it is not believed essential to the invention to create an oscillating weld pool, it is believed that this inherently occurs in most all instances. It is also recognized that several modes of oscillation can be induced and do in fact occur. The particular mode that is excited depends largely on the inductance of the circuit; a higher inductance excites a lower frequency mode of oscillation and a lower inductance excites a high frequency mode of oscillation. It should be noted that the resonant frequencies depend upon the dimensions of the liquid pool. These dimensions will in turn be affected by the level of welding current, the type of gas shield, the ratio of short circuit time to arc time, and the characteristics of the material being welded. The existence of this cyclic oscillation of the pool seems to be substantiated by the fact that the observed repetition rate of short circuits in many of the tests made in accordance with the present invention, is higher than would be possible from the rate of advance of the electrode toward the weld pool alone. In all probability the recurrence of short circuits is a combined effect of the pool coming up to meet the electrode and the electrode end advancing into the pool.

There are two basic types of operation that can occur in accordance with the present invention. The first of these may be termed the non-interrupted current type of operation and the other the interrupted current type of operation. In the non-interrupted current type of operation the short circuit condition is followed by the arcing condition which continues until the short circuit is reformed. In the interrupted current type of operation the short circuit condition is followed by the arcing condition which continues until the arc extinguishes for the lack of sufficient voltage to support it. Open circuit conditions then exist until the short circuit is reformed. Which of these two systems of operation occurs depends largely on the circuit constants.

Figure 7:
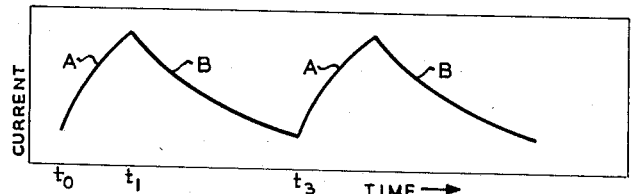
Figs. 7 through 10 depict the variations in current and voltage as they occur during the practice of the present invention.
Figure 8:
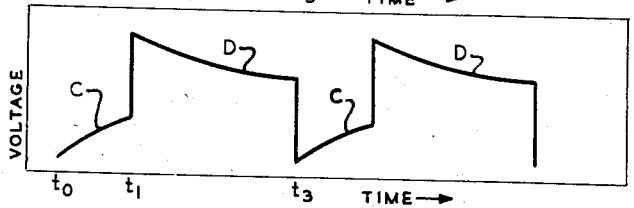

Figures 7 and 8 of the drawing represent the variations that occur in the current and voltage in the non-interrupted current type of operation. Referring to these drawings, $t_0$ represents the time at which the electrode initially contacts the weld pool. The current immediately starts to rise (curve A) (Fig. 7) at a rate determined by the power supply characteristics and the welding circuit constants. The rate of rise of the current during short circuit is essentially exponential in character and can be shown to follow generally the curve represented by the equation $$I = \frac{E_s}{R}\left(1 - \epsilon^{-\frac{Rt}{L}}\right) + I_0 \epsilon^{-\frac{Rt}{L}}$$

where $E_s$ represents the static voltage supplied by the power supply, R represents the total circuit resistance, $\epsilon$ is the natural logarithm base 2.718, $t$ is the time in seconds measured from time $t_0$ or its equivalent for any given cycle, L is the total inductance of the circuit, and I is the current at the time the short circuit occurs. During the time the current is building up along curve A of Figure 7 the voltage between the electrode contact point and the work (curve C) (Fig. 8) is also rising due primarily to the rising IR drop in the terminal portion of the electrode as the current increases. This voltage increase is believed to be substantially represented by the equation $$E = \frac{R_T}{R} E_s \left(1 - \epsilon^{-\frac{Rt}{L}}\right) + I_0 R_T \epsilon^{-\frac{Rt}{L}}$$

where $R_T$ represents the resistance of the terminal portion of the electrode, which is a portion of the total circuit resistance R. When time $t_1$ is reached the forces acting on the molten pool due to the peak current reached as a result of the rise along curve A causes the separation of the electrode from the molten weld pool initiating an arc therebetween. This is the change depicted by Figures 2 and 3. During this time, $t_0$—$t_1$, the voltage rises abruptly to the peak value indicated at $t_1$ on Figure 8. The arc formed as a result of the separation of the wire from the molten pool continues to burn and is sustained by the voltage resulting from the superimposition of the induced voltage derived from the inductive circuit on the power supply static voltage. Curve B of Fig. 7 illustrates the substantially exponential manner in which the current decays from the peak short circuit value during the period the arc is maintained. This curve is represented approximately by the following equation:

$$I = -\frac{E_0 - E_s}{R+k}\left(1 - \epsilon^{-\frac{R+k}{L}t}\right) + I_f \epsilon^{-\frac{R+k}{L}t}$$

where $E_0$ is the minimum voltage required to sustain the arc in equilibrium, $I_f$ is the peak short circuit current and $k$ is a factor representing the arc impedance. $E_0 + kI$ is a theoretical approximation of the arc voltage as a function of current.

Concurrently with the current decay along curve B from time $t_1$ to time $t_3$, the voltage decays along curve D of Fig. 8 which has been determined to be represented approximately by the equation $$E = E_0 + (R_T + k)I_f \epsilon^{-\frac{R+k}{L}t}$$
$$-\frac{R_T + k}{R+k}(E_0 - E_s)\left(1 - \epsilon^{-\frac{R+k}{L}t}\right)$$

Figures 2, 3, 4, 5, 6:
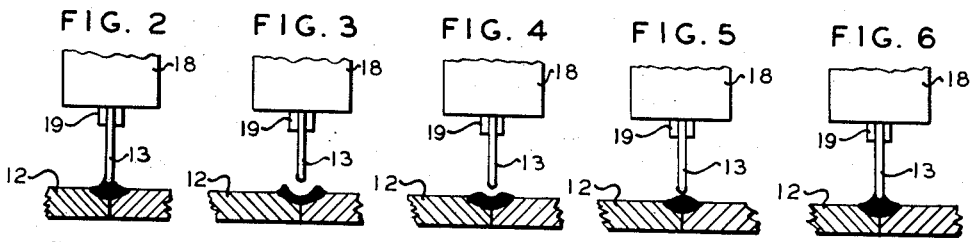
Figs. 2 through 6 illustrate the sequence of events at the arc through one complete cycle from short circuit to short circuit. These drawings are based primarily on observations of the arc through the medium of ultra-slow motion pictures.

As the current decreases as indicated by curve B of Fig. 7 the depression in the molten pool, caused by the current flow, fills, as shown in Figs. 4 and 5, and simultaneously the electrode, being continuously fed, approaches the pool until short circuit conditions are resumed at time $t_3$ to reinitiate the cycle.

Figure 9:
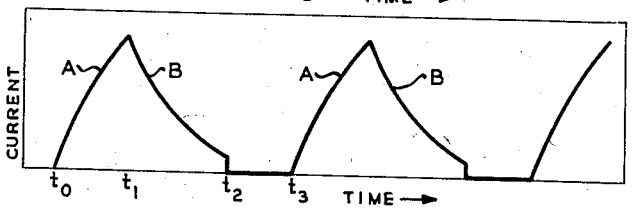

The other type of operation which has been referred to as the interrupted current type of operation is similar to that just described except that the available voltage falls below the minimum arc sustaining voltage before short circuiting recurs and there is therefore a period of open circuit (zero current) following the arcing condition and before the recurrence of the short circuit. This open circuit condition is represented on Figs. 9 and 10 as beginning at time $t_2$ and continuing until time $t_3$. The voltage pip occurring at time $t_2$ is the result of the sudden interruption of the current when the arc can no longer be sustained. With the arc extinguished, the voltage between the electrode and the work is equal to the open circuit voltage of the power supply and is represented by the horizontal line from time $t_2$ to time $t_3$ in Fig. 10. For the interrupted current type of operation, the current build up on short circuit starts from zero (curve A, Fig. 9) and is believed to vary substantially in accordance with the equation $$I = \frac{E}{R}\left(1 - \epsilon^{-\frac{Rt}{L}}\right)$$

The current decay from time $t_1$ to time $t_2$ is believed to follow substantially the equation $$I = \frac{E_0 - E_s}{R+k}\left(1 - \epsilon^{-\frac{R+k}{L}t}\right) + I_f \epsilon^{-\frac{R+k}{L}t}$$

Figure 10:
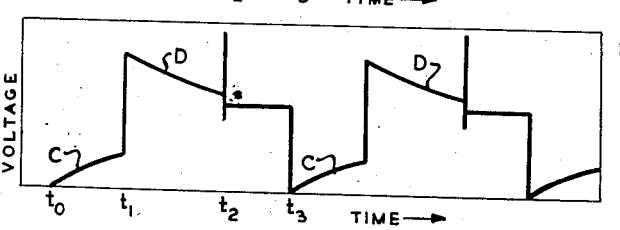

The equation for the voltage rise from $t_0$ to $t_1$, (curve C Fig. 10) is believed to be approximately $$E = \frac{R_T E_s}{R}\left(1 - \epsilon^{-\frac{Rt}{L}}\right)$$

and the decay (Curve D, Fig. 10)

$$E = E_0 + (R_T + k)I_f \epsilon^{-\frac{R+k}{L}t} \\ - \frac{R_T + k}{R + k}(E_0 - E_s)\left(1 - \epsilon^{-\frac{R+k}{L}t}\right)$$

When the voltage, E, between the electrode and work falls below $E_0$, the arc goes out, $E = E_g$ and $I = 0$. This condition prevails until the electrode and weld pool again make contact and the cycle is restarted at time $t_3$.

The novel welding method described in detail herein can be performed with a wide variety of apparatus under a wide variety of conditions. The following examples are illustrative of the present invention.

*Example 1*

| | |
|---|---|
| Work composition | Mild steel. |
| Electrode composition | Mild steel. |
| Electrode diameter | .035 inch. |
| Electrode feed rate | 210 inches per minute. |
| Distance from end of contact tube to end of electrode | ⅝ inch. |
| Shielding gas | Carbon dioxide. |
| Shielding gas flow rate | 30 cubic feet per hour. |
| Type of power supply | Motor generator-rising voltampere characteristic. |
| Inherent inductance of power supply | 60 micro henries. |
| Added circuit inductance | 85 micro henries. |
| Total inductance | 145 micro henries. |
| Electrode polarity | Positive. |
| Open circuit voltage | 18 volts. |
| Average welding voltage (voltmeter reading during welding) | 23.8 volts. |
| Average welding current (ammeter reading during welding) | 125 amperes. |
| Short circuit repetition rate | 54 per secon. |

*Example 2*

| | |
|---|---|
| Work composition | Mild steel. |
| Electrode composition | Mild steel. |
| Electrode diameter | .035 inch. |
| Electrode feed rate | 208 inches per minute. |
| Distance from end of contact tube to end of electrode | ¼ inch. |
| Shielding gas | Carbon dioxide. |
| Shielding gas flow rate | 40 cubic feet per hour. |
| Type of power supply | Motor-generator set—rising volt - ampere characteristic. |
| Inherent inductance of power supply | 53 micro henries. |
| Added circuit inductance | 20 micro henries. |
| Total inductance | 73 micro henries. |
| Electrode polarity | Positive. |
| Open circuit voltage | 17 volts. |
| Average welding voltage (voltmeter reading during welding) | 20 volts. |
| Average welding current (ammeter reading during welding) | 120 amperes. |
| Short circuit repetition rate | 140 per second. |

*Example 3*

| | |
|---|---|
| Work composition | Mild steel. |
| Electrode composition | Mild steel. |
| Electrode diameter | .035 inch. |
| Electrode feed rate | 208 inches per minute. |
| Distance from end of contact tube to end of electrode | ¼ inch. |
| Shielding gas | Carbon dioxide. |
| Shielding gas flow rate | 40 cubic feet per hour. |
| Type of power supply | Motor - generator set—rising volt - ampere characteristic. |
| Inherent inductance of power supply | 53 micro henries. |
| Added circuit inductance | 170 micro henries. |
| Total inductance | 223 micro henries. |
| Electrode polarity | Positive. |
| Open circuit voltage | 20 volts. |
| Average welding voltage (voltmeter reading during welding) | 23.5 volts. |
| Average welding current (ammeter reading during welding) | 120 amperes. |
| Short circuit repetition rate | 75 per second. |

*Example 4*

| | |
|---|---|
| Work composition | Mild steel. |
| Electrode composition | Mild steel. |
| Electrode diameter | .035 inch. |
| Electrode feed rate | 208 inches per minute. |
| Distance from end of contact tube to end of electrode | ¼ inch. |
| Shielding gas | Carbon dioxide. |
| Shielding gas flow rate | 40 cubic feet per hour. |
| Type of power supply | Motor-generator set—constant potential. |
| Inherent inductance of power supply | 33 micro henries. |
| Added circuit inductance | 20 micro henries. |
| Total inductance | 53 micro henries. |
| Electrode polarity | Positive. |
| Open circuit voltage | 23 volts. |
| Average welding voltage (voltmeter reading during welding) | 20.5 volts. |
| Average welding current (ammeter reading during welding) | 110 amperes. |
| Short circuit repetition rate | 165 per second. |

*Example 5*

| | |
|---|---|
| Work composition | Mild steel. |
| Electrode composition | Mild steel. |
| Electrode diameter | .035 inch. |
| Electrode feed rate | 208 inches per minute. |
| Distance from end of contact tube to end of electrode | ¼ inch. |
| Shielding gas | Carbon dioxide. |
| Shielding gas flow rate | 40 cubic feet per hour. |
| Type of power supply | Motor-generator set—constant potential. |
| Inherent inductance of power supply | 33 micro henries. |
| Added circuit inductance | 470 micro henries. |
| Total inductance | 503 micro henries. |
| Electrode polarity | Positive. |

*Example 5.—Continued*

| | |
|---|---|
| Open circuit voltage | 26.5 volts. |
| Average welding voltage (voltmeter reading during welding) | 24.5 volts. |
| Average welding current (ammeter reading during welding) | 120 amperes. |
| Short circuit repetition rate | 50 per second. |

*Example 6*

| | |
|---|---|
| Work composition | Mild steel. |
| Electrode composition | Mild steel. |
| Electrode diameter | 0.35 inch. |
| Electrode feed rate | 208 inches per minute. |
| Distance from end of contact tube to end of electrode | ¼ inch. |
| Shielding gas | Carbon dioxide. |
| Shielding gas flow rate | 40 cubic feet per hour. |
| Type of power supply | Transformer - rectifier - constant potential. |
| Inherent inductance of power supply | 170 micro henries. |
| Added circuit inductance | 20 micro henries. |
| Total inductance | 190 micro henries. |
| Electrode polarity | Positive. |
| Open circuit voltage | 21 volts. |
| Average welding voltage (voltmeter reading during welding) | 20 volts. |
| Average welding current (ammeter reading during welding) | 95 amperes. |
| Short circuit repetition rate | 140 per second. |

*Example 7*

| | |
|---|---|
| Work composition | Mild steel. |
| Electrode composition | Mild steel. |
| Electrode diameter | .062 inch. |
| Electrode feed rate | 150 inches per minute. |
| Distance from end of contact tube to end of electrode | ¼ inch. |
| Shielding gas | Carbon dioxide. |
| Shielding gas flow rate | 40 cubic feet per hour. |
| Type of power supply | Transformer - rectifier - constant potential. |
| Inherent inductance of power supply | 170 micro henries. |
| Added circuit inductance | 820 micro henries. |
| Total inductance | 990 micro henries. |
| Electrode polarity | Positive. |
| Open circuit voltage | 26 volts. |
| Average welding voltage (voltmeter reading during welding) | 22.5 volts. |
| Average welding current (ammeter reading during welding) | 118 amperes. |
| Short circuit repetition rate | 60 per second. |

*Example 8*

| | |
|---|---|
| Work composition | Mild steel. |
| Electrode composition | Mild steel. |
| Electrode diameter | .035 inch. |
| Electrode feed rate | 208 inches per minute. |
| Distance from end of contact tube to end of electrode | ¼ inch. |
| Shielding gas | Carbon dioxide. |
| Shielding gas to flow rate | 40 cubic feet per hour. |
| Type of power supply | Storage battery. |
| Inherent inductance of power supply | Negligible. |
| Added circuit inductance | 60 micro henries. |
| Total inductance | 60 micro henries. |
| Electrode polarity | Positive. |
| Open circuit voltage | 24 volts. |
| Average welding voltage (voltmeter reading during welding) | 21 volts. |
| Average welding current (ammeter reading during welding) | 105 amperes. |
| Short circuit repetition rate | 85 per second. |

*Example 9*

| | |
|---|---|
| Work composition | Mild steel. |
| Electrode composition | Mild steel. |
| Electrode diameter | .035 inch. |
| Electrode feed rate | 332 inches per minute. |
| Distance from end of contact tube to end of electrode | ¼ inch. |
| Shielding gas | Carbon dioxide. |
| Shielding gas flow rate | 40 cubic feet per hour. |
| Type of power supply | Transformer - rectifier - constant potential. |
| Inherent inductance of power supply | 170 micro henries. |
| Added circuit inductance | 20 micro henries. |
| Total inductance | 190 micro henries. |
| Electrode polarity | Negative. |
| Open circuit voltage | 23.5 volts. |
| Average welding voltage (voltmeter reading during welding) | 21.5 volts. |
| Average welding current (ammeter reading during welding) | 150 amperes. |
| Short circuit repetition rate | 140 per second. |

*Example 10*

| | |
|---|---|
| Work composition | Mild steel. |
| Electrode composition | Mild steel. |
| Electrode diameter | .035 inch. |
| Electrode feed rate | 208 inches per minute. |
| Distance from end of contact tube to end of electrode | ¼ inch. |
| Shielding gas | Helium. |
| Shielding gas flow rate | 40 cubic feet per hour. |
| Type of power supply | Transformer - rectifier - constant potential. |
| Inherent inductance of power supply | 170 micro henries. |
| Added circuit inductance | 20 micro henries. |
| Total inductance | 190 micro henries. |
| Electrode polarity | Positive. |
| Open circuit voltage | 22 volts. |
| Average welding voltage (voltmeter reading during welding) | 21.5 volts. |
| Average welding current (ammeter reading during welding) | 95 amperes. |
| Short circuit repetition rate | 130 per second. |

*Example 11*

| | |
|---|---|
| Work composition | Mild steel. |
| Electrode composition | Mild steel. |
| Electrode diameter | .035 inch. |
| Electrode feed rate | 208 inches per minute. |
| Distance from end of contact tube to end of electrode | ¼ inch. |
| Shielding gas | Nitrogen. |
| Shielding gas flow rate | 40 cubic feet per hour. |
| Type of power supply | Transformer - rectifier- constant potential |
| Inherent inductance of power supply | 170 micro henries. |
| Added circuit inductance | 20 micro henries. |
| Total inductance | 190 micro henries. |
| Electrode polarity | Positive. |

Example 11.—Continued

Open circuit voltage _____ 22 volts.
Average welding voltage (voltmeter reading during welding) _____ 21.5 volts.
Average welding current (ammeter reading during welding) _____ 100 amperes.
Short circuit repetition rate __ 230 per second.

NOTE.—This weld unsatisfactory from metallurgical point of view because of the nitrogen atmosphere.

Example 12

Work composition _____ Mild steel.
Electrode composition _____ Mild steel.
Electrode diameter _____ .035 inch.
Electrode feed rate _____ 208 inches per minute.
Distance from end of contact tube to end of electrode ____ ¼ inch.
Shielding gas _____ Argon+1% oxygen.
Shielding gas flow rate _____ 40 cubic feet per hour.
Type of power supply _____ Transformer - rectifier: constant potential.
Inherent inductance of power supply _____ 170 micro henries.
Added circuit inductance _____ 20 micro henries.
Total inductance _____ 190 micro henries.
Electrode polarity _____ Positive.
Open circuit voltage _____ 19.5 volts.
Average welding voltage (voltmeter reading during welding) _____ 19 volts.
Average welding current (ammeter reading during welding) _____ 113 amperes.
Short circuit repetition rate ___ 65 per second.

It can be readily determined from an examination of the above data that each of the three power supplies used in Examples 2–7 is capable of use in accordance with the present invention with rather widely varying values of total circuit inductance. For instance the same welding generator was used for Example 2 as for Example 3. In Example 2, 20 micro henries of inductance was added to the circuit. This is in the form of inductance in the welding leads and is virtually unavoidable. In Example 3 a total of 170 micro henries of inductance was added to the circuit. When the greater amount of inductance is added the generator voltage must be set slightly higher as indicated. As might be expected this higher inductance, higher voltage mode of operation results in a lower short circuit repetition frequency. Certain characteristics differences have been observed between the higher inductance lower short circuit frequency mode of operation (hereinafter referred to as mode 1) and the lower inductance higher short circuit frequency mode of operation (hereinafter referred to as mode 2).

Mode 1 can be described as a "soft" arc, where the operator cannot feel the electrode pressing against the work. This mode of operation is accompanied by a "crackling" noise. When welding with a mild steel electrode in a carbon dioxide shielding atmosphere mode 1 occurs when the total circuit inductance is in the range of from 200 to 1000 micro henries and the welding voltage in the rang of from 24 to 27 volts. The short circuit repetition rate is generally of the order of 40 to 90 short circuits per second. Mode 2 can be described as a "stiff" arc, in which the operator can feel the electrode pushing against the work. This type of arc is accompanied by a "buzzing" sound, which is clear and distinct from the crackle of the mode 1 arc. When welding with a mild steel electrode in a carbon dioxide shielding atmosphere mode 2 occurs when the total circuit inductance is in the range of from 40 to 250 micro henries and the welding voltage in the range of from 17 to 24 volts. The short circuit repetition rate is of the order of 100 to 250 short circuits per second. Of the two modes of operation, mode 2 appears to be most desirable. There is a very wide range of wire feed speeds that can be used with a given set of conditions in mode 2. For example, wire feed speed can be varied from 60 inches per minute to 400 inches per minute when using a 0.035 inch diameter steel electrode in carbon dioxide. Little or no operator skill is required in mode 2 operation. Even an inexperienced operator can make good quality vertical welds on the first attempt. This is believed to be without precedent in the welding art.

The distance from the end of the contact tube, or more precisely the point of electrical contact of the electrode and the contact element, to the arc end of the electrode is important to the performance of the process and to the quality of the weld produced. It is postulated that if this distance is long the resistance preheating of the electrode is great and a relatively low short circuit current surge will blast out the preheated metal. It has been found, for example that an additional 65 micro henry reactor was required when a welding gun was used which had the end of the contact tube recessed inside the shielding gas nozzle. The preferred condition of operation is with the end of the contact tube projecting from the end of the gas nozzle about ⅛ to ¼ inch and the electrode extension not exceeding about 15 times the electrode diameter. An electrode extension of ¼ inch to ½ inch has been found satisfactory in most cases. For this reason this invention is possible only with that type of electrode and apparatus in which the welding current is introduced into the electrode in the immediate vicinity of the arc. With metals of greater electrical conductivity longer electrode extensions can of course be tolerated. The invention is not limited to any particular metal or to any particular arc environment.

The static characteristics of the particular power supply is not of prime significance in the present invention. It is preferred to use the so-called "rising characteristic" or "constant potential" types. The latter include those power supplies having slightly drooping volt-ampere characteristic curves. The conventional "drooping" or "constant current" generator is generally not satisfactory because of its high open circuit voltage and inherent high leakage reactance.

The present invention is operable on either polarity. It is not as easy to avoid spatter with straight polarity (electrode negative) but straight polarity has some advantage where high deposition rates and low penetration are required. Reverse polarity is generally preferred.

It will be evident that as a result of this invention it has been made possible to weld at low currents and in virtually all atmospheres with little or no spatter and with a minimum of superheating of the weld metal. It is to be understood that the invention is not limited to the particular embodiments disclosed herein but may be used in other ways without departure from its spirit as defined by the following claims.

We claim:

1. A process for electric arc welding which comprises impressing an electrical potential between a consumable electrode and a workpiece in a circuit including a source of current and a predetermined value of inductive reactance, feeding said electrode toward said workpiece to cause said electrode to make electrical contact with said workpiece to initiate the flow of current in said circuit and thereafter form an arc between said electrode and said workpiece, and correlating the potential so impressed with the inductive reactance of the circuit and with the electrode feed rate to cause the arc to be unstable permitting the electrode to periodically contact the work and reinitiate the cycle.

2. A process for electric arc welding which comprises impressing an electrical potential between a consumable electrode and a workpiece in a circuit including a source of current and a predetermined value of inductive reactance, feeding said electrode toward said workpiece to cause said electrode to make electrical contact with said workpiece to initiate the flow of current in said circuit and thereafter form an arc between said electrode and said workpiece, and correlating the potential so impressed with the inductive reactance of the circuit and with the electrode feed rate to cause said arc to be constantly decreasing in length whereby said electrode periodically makes contact with said workpiece with a frequency to cause the transfer of metal from said electrode to said workpiece to take place only during the time said electrode is in contact with said workpiece.

3. In the method of gas shielded electric arc welding in which weld metal is transferred to a workpiece from a wire electrode continuously fed toward said workpiece the improvement which comprises correlating the voltage impressed between said electrode and said workpiece with the inductive reactance of the welding circuit and with the electrode feed rate to cause periodic short circuiting of said electrode to a molten weld pool on said workpiece, each short circuit being followed by an arc between said electrode and said pool having a duration less than the minimum required for a droplet of molten metal to form on said electrode and transfer from said electrode to said weld pool.

4. A method of electric arc welding which comprises impressing, from a source of welding current, an electrical potential of from 1 to 10 volts below a steady state arc sustaining potential between a wire electrode and a workpiece in a welding circuit which includes said source of welding current and a predetermined total value of inductive reactance, feeding said wire electrode toward said workpiece at a constant rate whereby said electrode contacts said work causing a current surge in the welding circuit sufficient to separate said electrode from said workpiece to form an arc therebetween but limited by said inductive reactance of said circuit to a value below which excessive spatter is created, and maintaining said arc for a limited time with the potential available between said electrode and work, said available potential including the potential resulting from the decay of the field about said inductive reactance as said arc current decreases whereby the spacing between said electrode and workpiece decreases to zero causing the cycle to repeat.

5. A method of electric arc welding according to claim 4 in which the cycle repeats at an average rate of from about 40 to about 250 cycles per second.

6. A method of electric arc welding which comprises impressing, from a source of welding current, an electrical potential of from 17 to 26 volts between a ferrous wire electrode having a diameter of from 0.35 to .062 inches and a ferrous workpiece in a welding circuit which includes said source of welding current and which includes a total circuit inductive reactance of from 40 to 1000 micro henries, shielding the end of said electrode and a localized area of said workpiece adjacent said electrode from the air with carbon dioxide, and feeding said electrode toward said workpiece at a rate of from 60 to 400 inches per minute to cause alternate arcing and short circuiting of said electrode and the weld pool formed on the surface of said workpiece at a short circuit repetition rate of from 40 to 250 short circuits per second.

7. An electric arc welding system comprising in a welding circuit a consumable wire electrode, a workpiece, and a source of welding current delivering a potential between the electrode and workpiece of from 1 to 10 volts below the minimum steady state arc sustaining potential, said welding circuit having a total inductive reactance, including the inductive reactance of said source of welding current, of from 40 to 1000 micro henries and means for feeding said wire electrode toward said workpiece at a preselected constant speed such that short circuit and arcing conditions are alternately established between said electrode and work at a repetition rate such that the arc time between short circuits is insufficient to permit the transfer of molten metal from said electrode to said workpiece between short circuits.

8. A method of welding in the vertical and overhead position which comprises supplying welding current through an inductive circuit to the work and to a wire electrode continuously fed toward the work at a potential to cause the electrode to alternately arc and short circuit with the work at a short circuit repetition rate such that substantially no molten metal transfers from the electrode to the work during the arcing period of the cycle and the weld pool size and temperature are thereby maintained at a value to prevent displacement of the weld metal prior to solidification.

9. Electric arc welding apparatus comprising, in combination, a power source for supplying welding current to a gas shielded welding arc of the type wherein the welding arc is established intermittently between a weld pool of molten metal on the workpiece and a consumable electrode fed continuously toward said weld pool at a substantially constant rate, said power source having an output voltage which is at least 1 volt below the minimum voltage required to sustain a welding arc between said electrode and said weld pool, said power source also having a current response characteristic such that upon initiation of a short circuit condition between said electrode and said weld pool a current surge is produced which will establish a welding arc between said electrode and said weld pool, and an inductive reactance connected to said power source for limiting the rate of rise of welding current under short circuit conditions to thereby limit the maximum current attained to a value which will not cause spatter of molten metal from said weld pool and for providing an induced voltage to increase the voltage across the arc to an arc sustaining value for a limited period of time following termination of short circuit conditions sufficient to enable the tip of said electrode to be melted by arc action but which is insufficient to enable any substantial amount of electrode metal to be transferred across the arc to said weld pool during said period of arc maintenance.

References Cited in the file of this patent

FOREIGN PATENTS

| | | |
|---|---|---|
| 410,494 | Great Britain | May 16, 1934 |
| 429,253 | Great Britain | Aug. 22, 1933 |
| 443,341 | Great Britain | Feb. 26, 1936 |
| 766,915 | Great Britain | Jan. 30, 1957 |
| 767,688 | Great Britain | Feb. 6, 1957 |

UNITED STATES PATENT OFFICE
CERTIFICATE OF CORRECTION

Patent No. 2,886,696                                                        May 12, 1959

Roger W. Tuthill et al.

It is hereby certified that error appears in the printed specification of the above numbered patent requiring correction and that the said Letters Patent should read as corrected below.

Column 7, line 56, for "secon" read -- second --; column 9, line 14, for "Electrode Diameter "0.35 inch"" read -- Electrode Diameter .035 inch --; column 13, line 52, for "0.35" read -- .035 --.

Signed and sealed this 5th day of January 1960.

(SEAL)
Attest:

KARL H. AXLINE
Attesting Officer

ROBERT C. WATSON
Commissioner of Patents